United States Patent
Szita

(10) Patent No.: US 6,667,845 B1
(45) Date of Patent: Dec. 23, 2003

(54) METHOD AND SYSTEM FOR COMPENSATING FOR ACTUATOR RESONANCES

(75) Inventor: Gabor Szita, Santa Clara, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 395 days.

(21) Appl. No.: 09/703,003

(22) Filed: Oct. 30, 2000

Related U.S. Application Data

(60) Provisional application No. 60/162,312, filed on Oct. 28, 1999.

(51) Int. Cl.[7] .............................................. G11B 5/596
(52) U.S. Cl. ............................................... 360/78.04 D
(58) Field of Search ........................... 360/78.04, 78.09; 318/560, 77.02

(56) References Cited

U.S. PATENT DOCUMENTS 6,005,742 A * 12/1999 Cunningham et al. ... 360/78.05

* cited by examiner

Primary Examiner—David Hudspeth
Assistant Examiner—Mitchell Slavitt
(74) Attorney, Agent, or Firm—Derek J. Berger

(57) ABSTRACT

A controller generates a control signal that is input into a voice coil motor and causes an actuator to move to a particular position on a storage disk. An actuator model of the actuator is also coupled to the output, of the controller. The actuator model is used to estimate the response of the actuator when a signal is input into the voice coil motor. If some voltage is induced in the voice coil motor by an external vibration or resonance of the actuator, then the voltage output by the actuator will not be equal to the estimated voltage output by the actuator model. The difference of the estimated voltage and the actual voltage output the actuator is input into a resonance controller. The resonance controller then generates a compensation signal that is combined with the control signal to compensate for any actuator resonances.

26 Claims, 5 Drawing Sheets

Figure 1 - Prior Art

METHOD AND SYSTEM FOR COMPENSATING FOR ACTUATOR RESONANCES

CROSS-REFERENCE TO RELATED APPLICATIONS

This application is related to and claims the benefit of commonly assigned U.S. Provisional Application No. 60/162,312, filed on Oct. 28, 1999 and entitled "Active Damping Of VCM Actuator Resonance Using Back EMF Measurement." The subject matter of this related application is incorporated herein by reference.

BACKGROUND

1. Field of the Invention

The present invention relates to data storage systems, and more particularly to data storage systems that store data on a recording media. Still more particularly, the present invention relates to a method and system for compensating for actuator resonances.

2. Description of the Prior Art

In data storage systems, such as hard disk drives, the recording head (or heads) is positioned over a storage disk surface by a rotary or linear actuator. The position of the recording head relative to the storage disk is measured by means of special servo marks written on, or formed in, the surface of the disk. The recording head is typically located at one end of the actuator, and the actuator is moved, or positioned, by a motor. With disk drive systems, a voice coil motor moves the actuator. A voice coil motor is, in simple terms, a coil between two magnets. To move the actuator, a current is applied to the coil to induce a force (e.g. voltage), and this force moves the actuator.

FIG. 1 depicts a prior art control system for a data storage system. Control system 100 includes a controller 102, a driver 104, and an actuator 106. Actuator 106 includes a voice coil motor 107. Typically, the controller 102 is comprised of a microprocessor, analog-to-digital converters, and digital-to-analog converters.

The current position of the recording head (r) is input into the controller via signal line 108. The controller 102 then generates a signal v on line 110 that is input into driver 104. Since the exemplary embodiment is a hard disk drive system, a current signal is typically used to move actuator 106. Consequently, voltage signal v from the controller 102 is converted to a current signal u by driver 104. Current signal u is then input into the voice coil motor 107 via line 112. In response, voice coil motor 107 generates a force that causes the actuator 106 to move. The position signal y is determined by reading at least one servo mark written on the storage disk during manufacturing.

Because the recording head reads data from, and/or writes data to, the disk, accurate positioning of the recording head is very important in data storage systems. But accurate positioning of the recording head can be difficult due to the transient motion created when the actuator and head are moved. Since the actuator is similar to a long beam, moving it causes the actuator to oscillate, or resonate. But any vibrations, oscillations, or resonances in the actuator creates collateral voltage in the voice coil motor. In other words, moving the actuator generates a voltage is the voice coil motor. The collateral voltage caused by the movement of the actuator affects the position of the recording head, since the collateral voltage is included in the voltage output by the voice coil motor and input into the actuator. Thus, actuator resonances make accurate positioning of the recording head difficult.

One conventional method for compensating for the oscillations of the recording head is to determine the various oscillations by appropriate processing of the position signal 114. Then, a correction can be applied to the voice coil motor 107 to attenuate the resonances. One limitation to this method, however, is that certain resonant modes of the actuator 106 may be higher than half of the sampling frequency (known as the Nyquist frequency) of the position signal 114. According to Shannon's theorem, these frequency components cannot be reconstructed from signal 114, and therefore, cannot be compensated for using this method.

SUMMARY

The present invention overcomes the limitations of the prior art by providing a method and system for compensating for the actuator resonances that may be higher than the Nyquist frequency. In an exemplary embodiment, a controller generates a control signal that is input into a voice coil motor and causes an actuator to move to a particular position on the storage disk. An actuator model is also coupled to the output of the controller. The actuator model is used to estimate the response of the actuator when a signal is input into the voice coil motor. If some voltage is induced in the voice coil motor by an external vibration or resonance of the actuator, then the voltage output by the actuator will not be equal to the estimated voltage output by the actuator model. The difference of the estimated voltage and the actual voltage output the actuator is input into a resonance controller. The resonance controller then generates a compensation signal that is combined with the control signal to compensate for any actuator resonances.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DETAILED DESCRIPTION

The present invention relates to a method and system for compensating for actuator resonances. The following description is presented to enable one of ordinary skill in the art to make and use the invention and is provided in the context of a specific embodiment, namely a hard disk drive system. However, the present invention is not limited to this embodiment. Various modifications to the specific embodiments will be readily apparent to those skilled in the art and the generic principles herein may be applied to other implementations of data storage systems and/or control systems for data storage systems. Thus, the present invention is not intended to be limited to the embodiment shown but is to be accorded the widest scope consistent with the appended claims and with the principles and features described herein.

Figure 1:
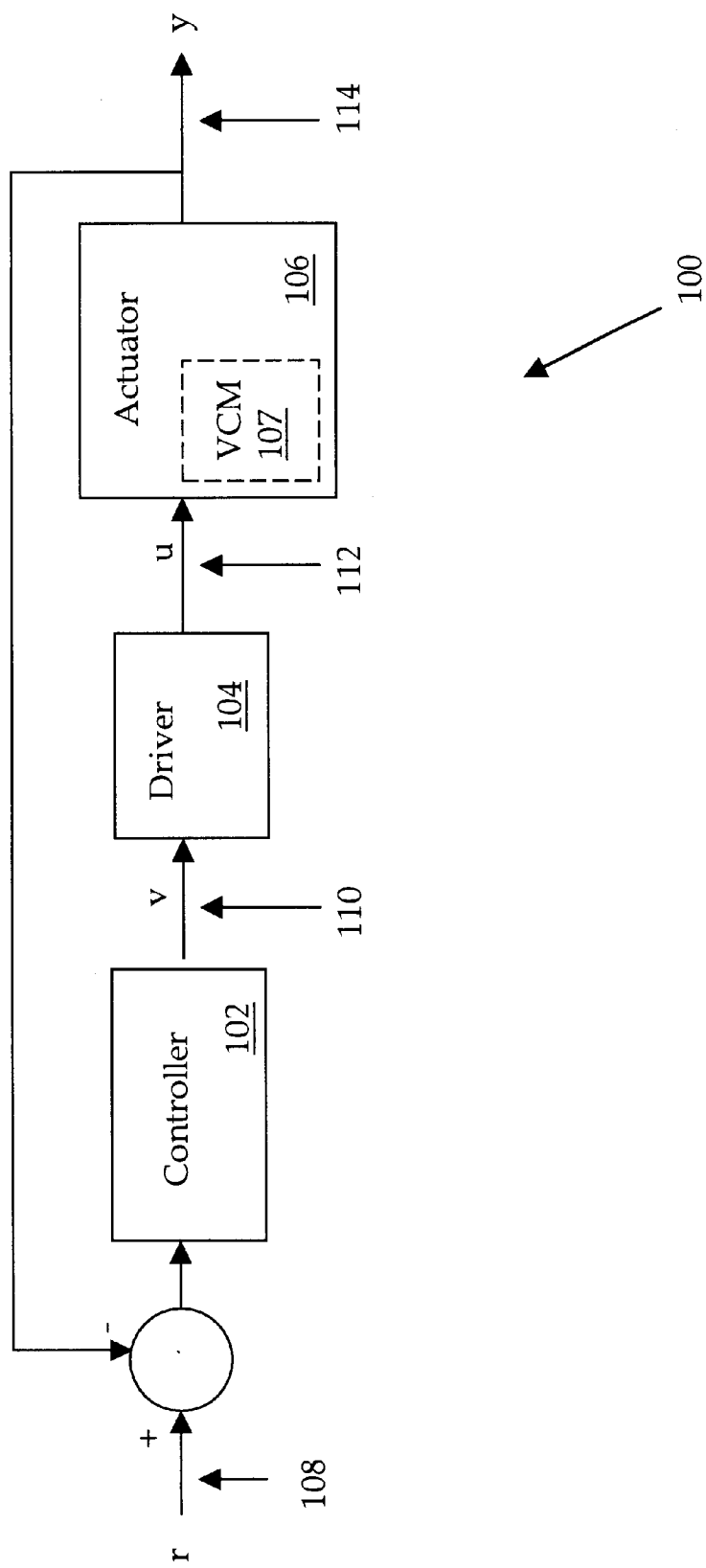
FIG. 1 is a block diagram depicting a prior art control system for a data storage system.
Figure 2:
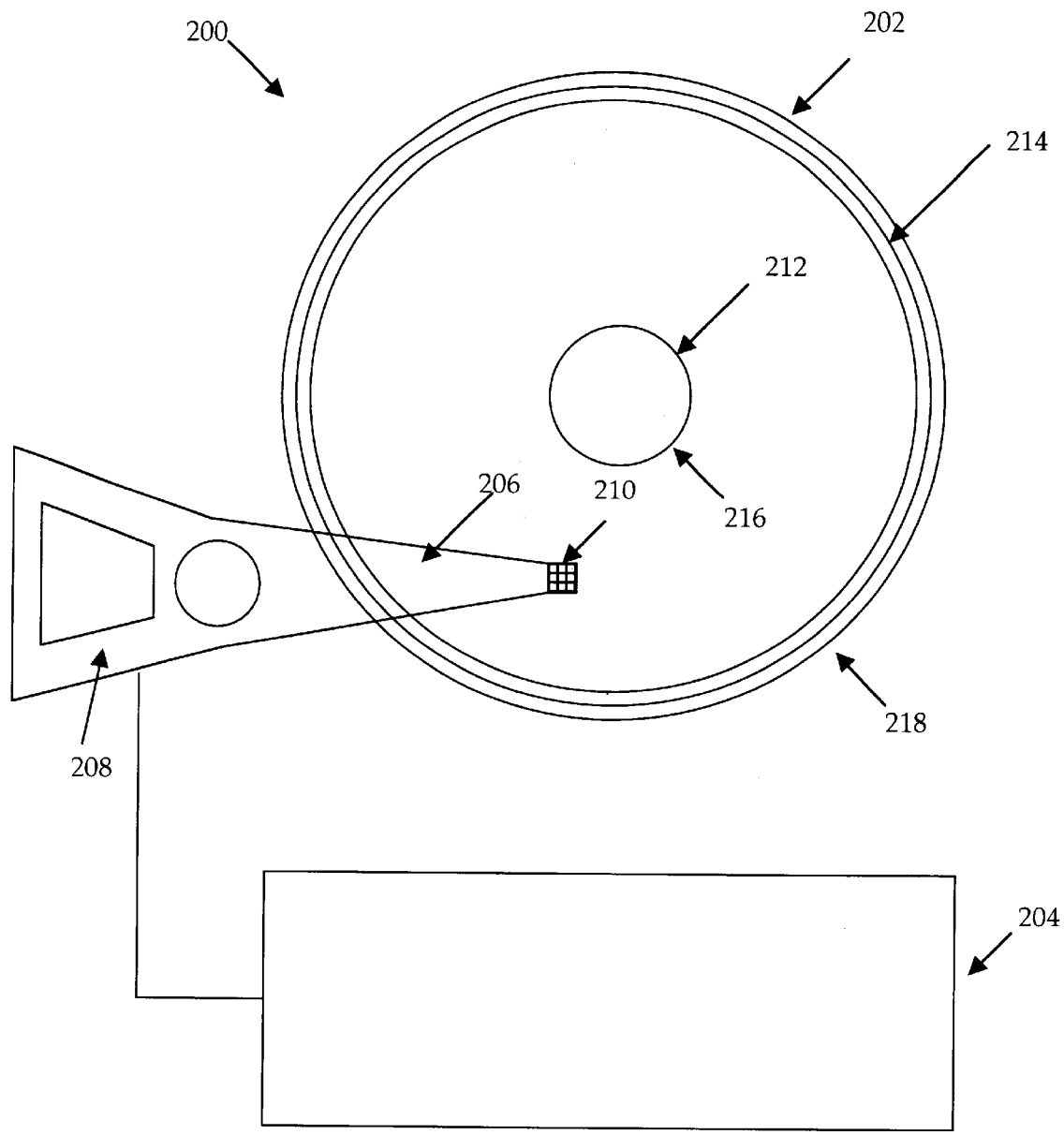
FIG. 2 is a diagram illustrating a data storage system that can be used with the present invention.

FIG. 2 depicts a data storage system that can be used with the present invention. Data storage system 200 in this exemplary embodiment is a hard disk drive system. Data storage system 200 includes one or more storage disks 202, a storage system controller 204, an actuator 206, a voice coil motor 208, a recording head 210, and a rotating spindle 212. The recording head 210 is comprised of at least one read head and at least one write head, and is positioned at the end of actuator 206 which is moved via voice coil motor 208. The recording head 210 transfers data between storage system controller 204 and a specific physical location on recording disk 202. Data is preferably stored in many approximately consecutively numbered concentric rings or "tracks" 214 on recording disk 202. For clarity, only two tracks 214 are shown in FIG. 2. The tracks are displaced radially from each other, beginning at the inner diameter 216 of the disk 202 and continuing to the outer diameter 218 of the disk 202.

Storage system controller 204 may randomly access a specific logical location on storage disk 202 via a particular track address and a particular sector address. Tracks 214 are very closely spaced in order to maximize storage capacity and economy. The mechanical precision of the movement of storage disk 202 and the movement of recording head 210 is critical to accessing the proper data storage location on storage disk 202. Storage system controller 204 thus requires some means for precisely positioning recording head 210 quickly and accurately over tracks 214 for subsequent storage and retrieval operations.

Figure 3A:
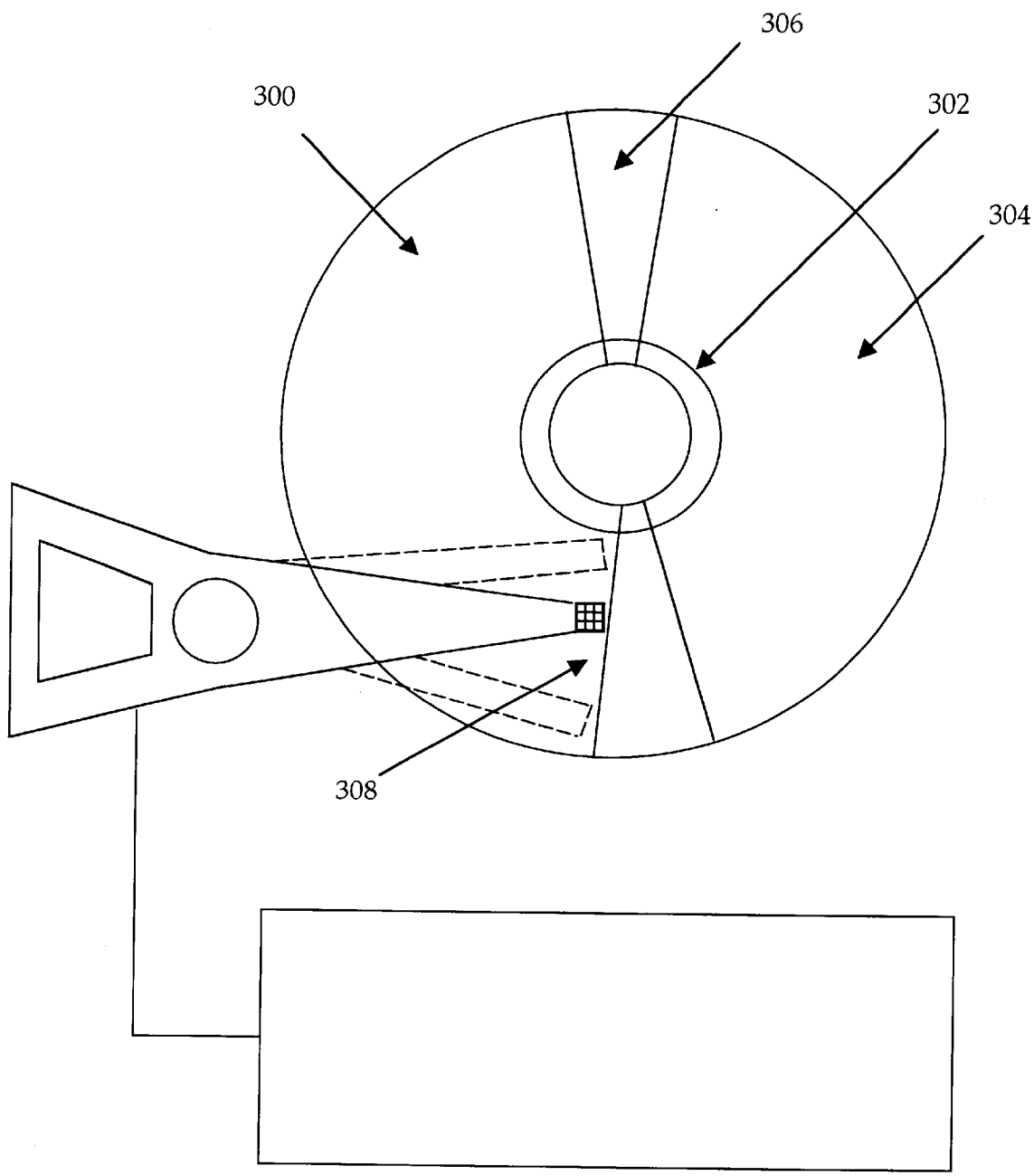
FIG. 3(a) is a diagram depicting a surface of an exemplary storage disk.
Figure 3B:
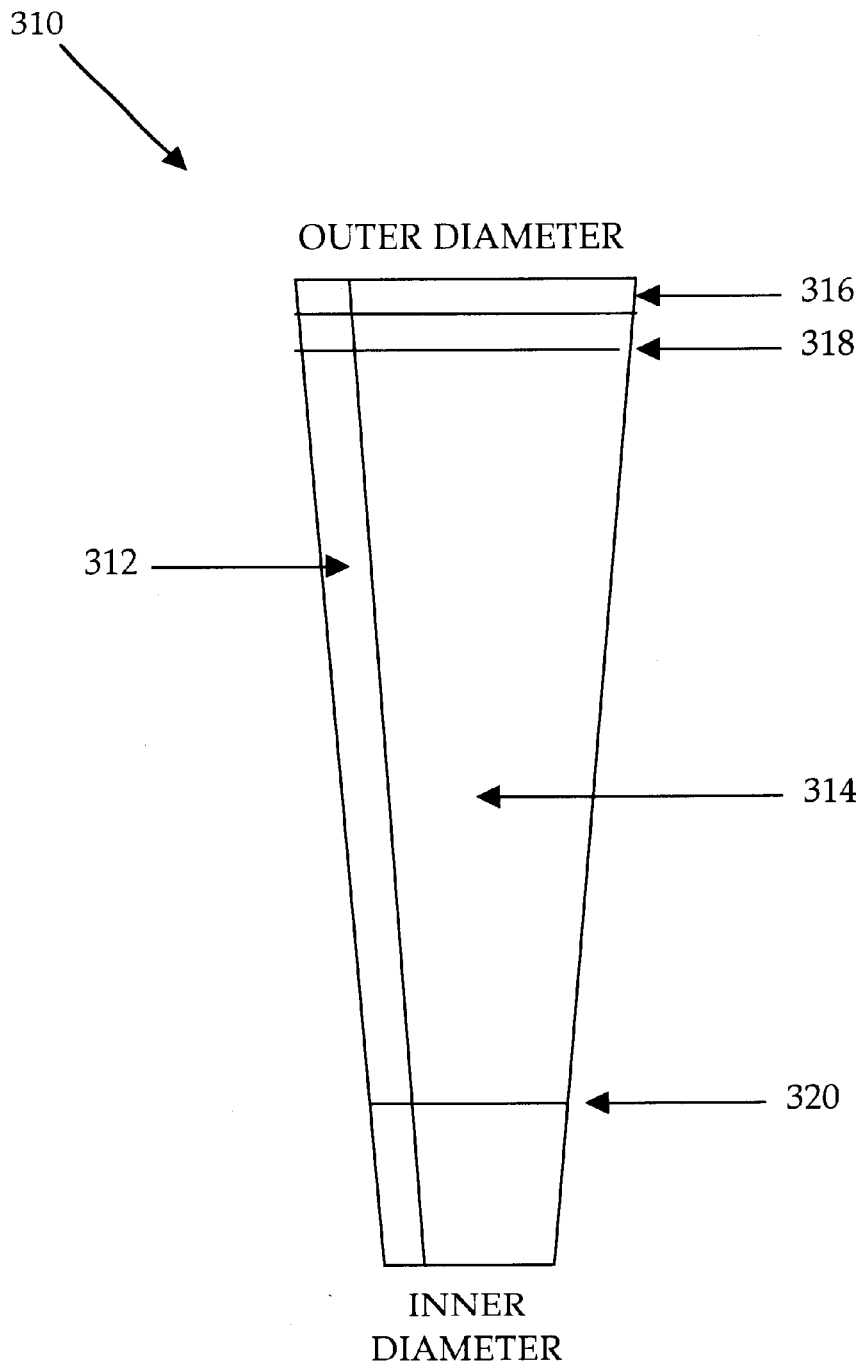
FIG. 3(b) is a linearized diagram of an exemplary sector illustrated in, FIG. 3(a)

Referring now to FIG. 3($a$), a diagram of a surface of an exemplary storage disk is illustrated. The surface 300 of storage disk 202 typically includes a landing zone 302, a useable data zone 304, arc-shaped sectors 306, and an arc-shaped path 308 taken across the surface 300 by recording head 210. A linearized diagram of an exemplary sector 306 is shown in FIG. 3($b$). Sector 310 includes a servo sector 312, a data wedge 314, a pair of neighboring numbered concentric tracks 316 and 318, and a border 320 between landing zone 302 and useable data zone 304. Data wedge 314 includes stored user data, while servo sector 312 includes address and alignment information (e.g. servo marks) used by the disk drive system.

Figure 4:
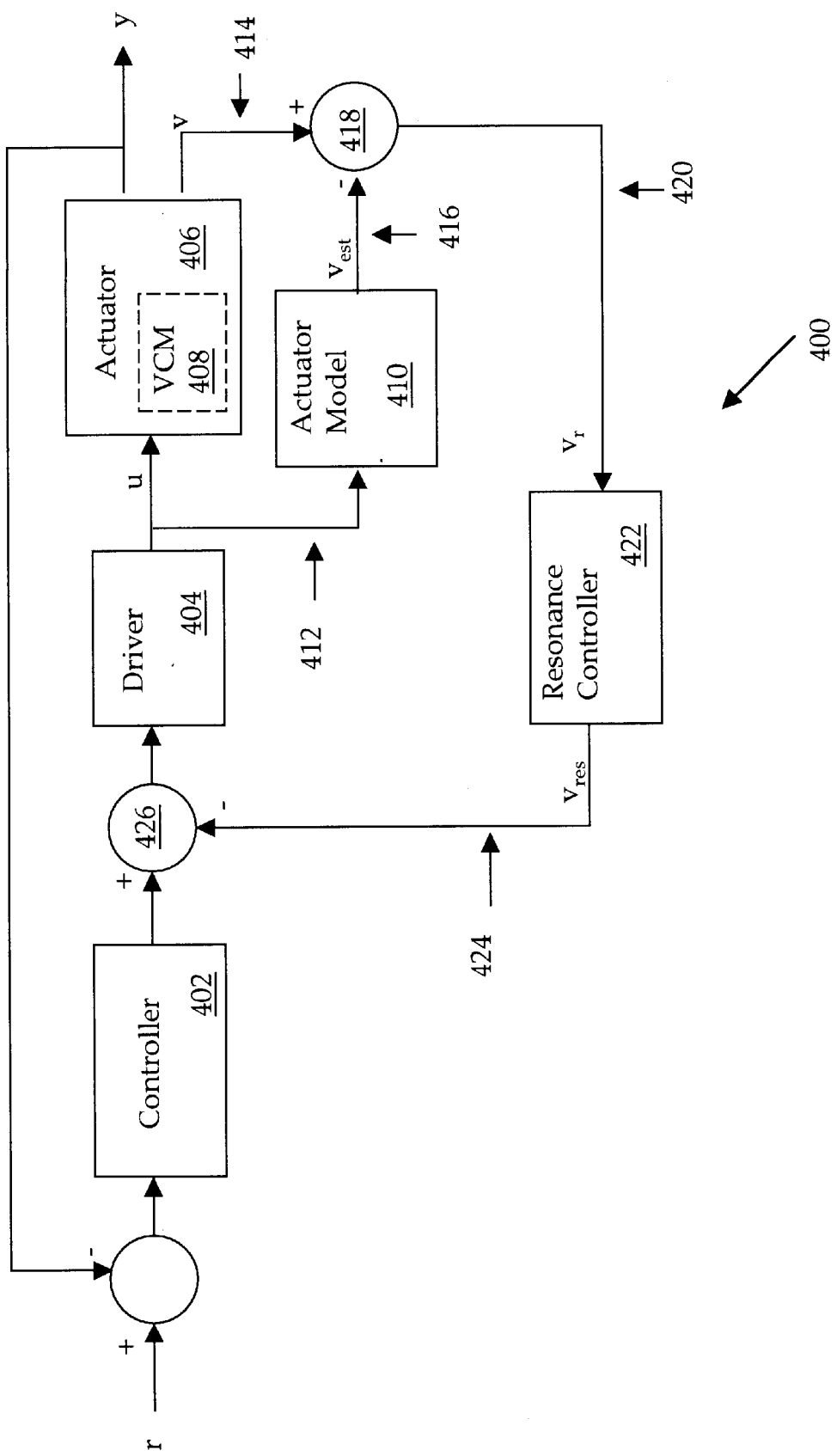
FIG. 4 is a block diagram illustrating a control system for a data storage system according to the present invention.

FIG. 4 is a block diagram illustrating a control system for a data storage system according to the present invention. The, control system 400 includes a controller 402, a driver 404, and an actuator 406. The actuator 406 includes a voice coil motor 408. An actuator model 410 is coupled to the output of the driver 404. In this exemplary embodiment, the actuator model 410 is comprised of a transfer function of the actuator 406. In an alternative embodiment, the actuator model is comprised of an electrical model of the actuator 406. The present invention, however, is not limited to these two embodiments. Any type of model that estimates the response of the actuator 406 to an input signal can be used with the present invention.

The actuator 406 is coupled to the output of the driver 404. The driver 404 outputs a signal u, typically a current signal, that is input into the voice coil motor 408. The signal u generates a force in the voice coil motor 408 that causes the actuator 406 to move. A position signal y is then determined by reading at least one servo mark written on the storage disk during manufacturing.

The signal u is also input into the actuator model 410 via line 412. In response, the actuator model 410 generates an estimated voltage signal $v_{est}$, which is an estimate of the signal output by actuator 406 in response to signal u. If some voltage is induced in the voice coil motor 408 by an external vibration or resonance, then the voltage measured across actuator 406 will not be equal to the estimated voltage on the output of the actuator model 410.

The signal v on line 414 is comprised of the voltage generated across the voice coil motor 408 by signal u (voltage $v_u$), as well as the voltage generated by any actuator resonances (voltage $v_{vib}$). In other words, $v=v_u+v_{vib}$. The signal v is input into block 418, where the signal output from the actuator model $v_{est}$ is subtracted from the signal v. Since the actuator model 410 estimates the response of the actuator 406 to an input, the estimated voltage signal $v_{est}$ on line 416 is approximately equal to $v_u$. Since $v_u \approx v_{est}$, this leaves the following:

$$v-v_{est}=(v_u+v_{vib})-v_{est}\approx(v_{est}+v_{vib})-v_{est}\approx v_{vib}$$

Thus, the signal output on line 420 ($v_r$) is approximately equal $v_{vib}$, the voltage induced in the voice coil motor 408 by external resonances of the actuator 406. The signal $v_r$ is then input into resonance controller 422. Resonance controller 422 in the exemplary embodiment is a filter designed to attenuate the actuator resonances. Therefore, the signal $v_{res}$ output by resonance controller 422 on line 424 represents the signal needed to compensate for the signal (or signals) generated by any external resonances of the actuator 406.

The signal $v_{res}$ is then input into block 426 via line 424, where it is subtracted from the control signal output by the controller 402. Subtracting $v_{res}$ from the control signal output by the controller 402 reduces, or eliminates, the effect the actuator resonances have on the positioning of the recording head.

While the invention has been particularly shown and described with reference to a preferred embodiment, it will be understood by those skilled in the art that various changes in form and detail may be made therein without departing from the spirit and scope of the invention.

What is claimed is:

1. A data storage system, comprising:
   a positioning element;
   a control block coupled to an input of the positioning element, wherein the control block generates a control signal for the positioning element;
   a positioning model coupled to the input of the positioning element, wherein the positioning model estimates a response of the positioning element when a signal is input into the positioning element; and
   a resonance controller coupled to an output of the positioning element and an output of the positioning model, wherein the resonance controller generates a compensation signal that is fed back and combined with the control signal from the control block to compensate for at least one resonance of the positioning element.

2. The data storage system of claim 1, further comprising a driver coupled between the control block and the positioning element.

3. The data storage system of claim 1, wherein the positioning element is comprised of an actuator.

4. The data storage system of claim 3, wherein the positioning model is comprised of a transfer function model of the actuator.

5. The data storage system of claim 3, wherein the positioning model is comprised of an electrical model of the actuator.

6. The data storage system of claim 3, wherein the resonance controller is comprised of a filter designed to attenuate any resonances from the actuator.

7. The data storage device of claim 1, in which the data storage device comprises a disc drive.

8. A controller for a control system in a data storage system, the data storage system comprising a positioning element, wherein the controller controls the positioning of the positioning element, and wherein the controller includes a resonance controller that generates a compensation signal based on an output of a model of the positioning element and an output of the positioning element to compensate for at least one resonance of the positioning element.

9. The controller of claim 8, further including a driver coupled to the input of the positioning element.

10. The controller of claims 8, wherein the positioning element is an actuator.

11. The controller of claim 10, wherein the model of the positioning element is comprised of transfer function.

12. The controller of claim 10, wherein the model of the positioning element is comprised of an electrical model of the actuator.

13. The controller of claim 10, wherein the resonance controller is comprised of a filter designed to attenuate any resonances from the actuator.

14. The controller of claim 8, in which the data storage system comprises a disc drive.

15. A method for compensating for resonances from a positioning element in a data storage system, the method comprising determining a position signal for the positioning element;

generating an estimated signal by inputting a control signal into a positioning model, wherein positioning model estimates a response of the positioning element to an input signal;

generating a compensation signal based on the position signal and the estimated signal; and constructing a modified control signal for the positioning element based on the compensation signal and a control signal, wherein the compensation signal is combined with a control signal in order compensate for at least one resonance of the positioning element.

16. The method of claim 15, wherein the step of determining a position signal for the positioning element comprises the step of reading at least one servo mark on a storage disk, wherein the at least one servo mark is used to indicate the position of an actuator.

17. The method of claim 16, wherein the step of generating an estimated signal by inputting a control signal into a positioning model comprises the step of applying a transfer function to the control signal to generate the estimated signal, wherein the transfer function models the actuator.

18. The method of claim 16, wherein the step of generating an estimated signal by inputting a control signal into a positioning model comprises the step of inputting a control signal into an electrical model of the actuator to generate the estimated signal.

19. The method of claim 16, wherein the step of generating a compensation signal based on the position signal and the estimated signal comprises the step of generating a compensation signal by summing the estimated signal with the position signal.

20. The method of claim 16, wherein the step of constructing a modified control signal for the positioning element comprises the step of constructing a modified control signal for the actuator by summing the compensation signal with a control signal in order to compensate for at least one resonance of the actuator.

21. The compensating method of claim 15, in which the data storage system comprises a disc drive.

22. A method for compensating for resonances from a positioning element in a data storage system, the method comprising:

determining a position signal for the positioning element;

determining an estimated signal for the positioning element, wherein the estimated signal represents a response of the positioning element to an input signal; and determining a compensation signal based on the position signal and the estimated signal, wherein the compensation signal is used to compensate for any resonances from the positioning element.

23. The method of claim 22, wherein the step of determining a position signal for the positioning element comprises the step of reading at least one servo mark on a storage medium, wherein the at least one servo mark indicates a position for the positioning element.

24. The method of claim 23, wherein the step of determining an estimated signal for the positioning element comprises the step of inputting a control signal into a positioning model, wherein the positioning model estimates a response of the positioning element to an input signal.

25. The method of claim 24, wherein the step of determining a compensation signal based on the position signal and the estimated signal comprises the step of constructing a modified control signal for the positioning element, wherein the position signal and the estimated signal are combined and utilized to generate a resonance signal that is then combined with a control signal in order compensate for at least one resonance of the positioning element.

26. The compensating method of claim 22, in which the data storage system comprises a disc drive.

* * * * *